United States Patent [19]

Shaffner

[11] Patent Number: 4,763,595
[45] Date of Patent: Aug. 16, 1988

[54] LINE FASTENING UNIT

[76] Inventor: Lorn O. Shaffner, 12383 Arrowhead Ct., Eastport, Mich. 49627

[21] Appl. No.: 46,566

[22] Filed: May 6, 1987

Related U.S. Application Data

[63] Continuation-in-part of Ser. No. 749,659, Jun. 28, 1985, Pat. No. 4,683,831.

[51] Int. Cl.⁴ ............................................. F16B 39/02
[52] U.S. Cl. ..................................... 114/218; 114/108
[58] Field of Search ............... 114/108, 109, 102, 113, 114/218, 230; 24/130, 130 L, 115 G, 115 L, 117, 122, 129 C, 131 C; 411/404, 87, 88, 101, 102

[56] References Cited

U.S. PATENT DOCUMENTS

| | | | |
|---|---|---|---|
| 415,965 | 11/1889 | Fletcher | 114/199 |
| 533,603 | 2/1895 | McEvoy | 411/87 |
| 1,960,171 | 5/1934 | Seeger | 173/313 |
| 2,443,335 | 6/1948 | Vogel | 24/136 L |
| 2,677,863 | 5/1954 | St. John | 114/218 |
| 2,890,734 | 6/1959 | Mullin | 411/87 |
| 3,352,273 | 11/1967 | Herreshoff et al. | 114/218 |
| 3,398,714 | 8/1968 | Wallin et al. | 114/218 |
| 3,473,505 | 10/1969 | Brown | 114/218 |
| 3,648,749 | 3/1972 | Warren | 411/87 |
| 3,838,659 | 10/1974 | Coleman, II | 114/218 |
| 4,104,603 | 8/1978 | Guthmann | 114/218 |
| 4,361,938 | 12/1982 | Emery | 24/130 |

FOREIGN PATENT DOCUMENTS 733821  4/1943  Fed. Rep. of Germany ........ 411/87

Primary Examiner—Sherman D. Basinger
Assistant Examiner—Clifford T. Bartz
Attorney, Agent, or Firm—Miller, Morriss and Pappas

[57] ABSTRACT

A line securing or fastening device having a base, a neck tapering upwardly from the base and a generally arcuate knob portion on top of the neck and two transverse wedge-shaped channel openings through the principal axis passing through the device and the channels separating the neck and knob into plural segments or posts open at the top and adapted to be firmly secured to a structure such as a hull or deck so as to provide an easy means of adjustably securing lines, such as mooring lines and admitting of quick release from the fastening device.

4 Claims, 5 Drawing Sheets

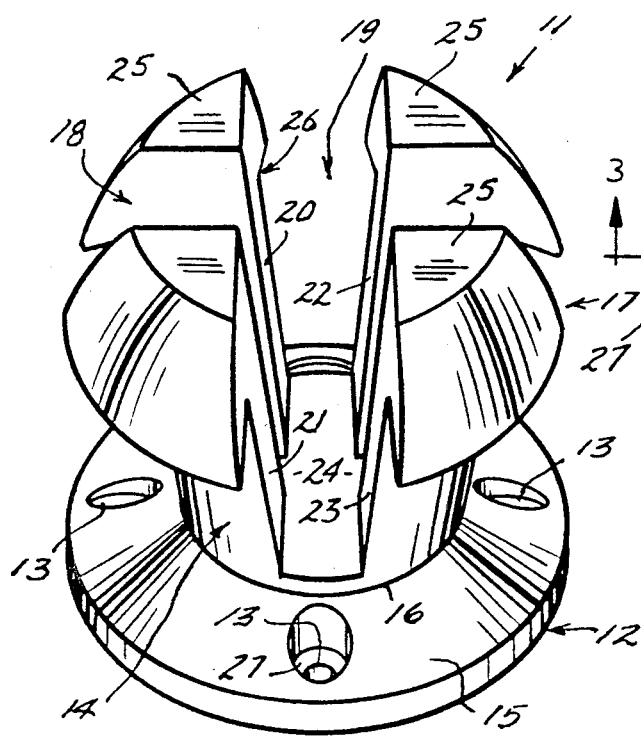
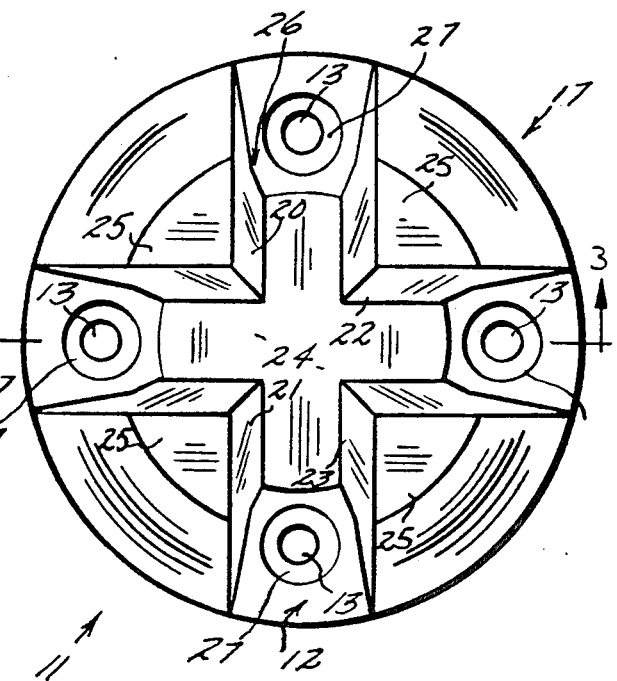
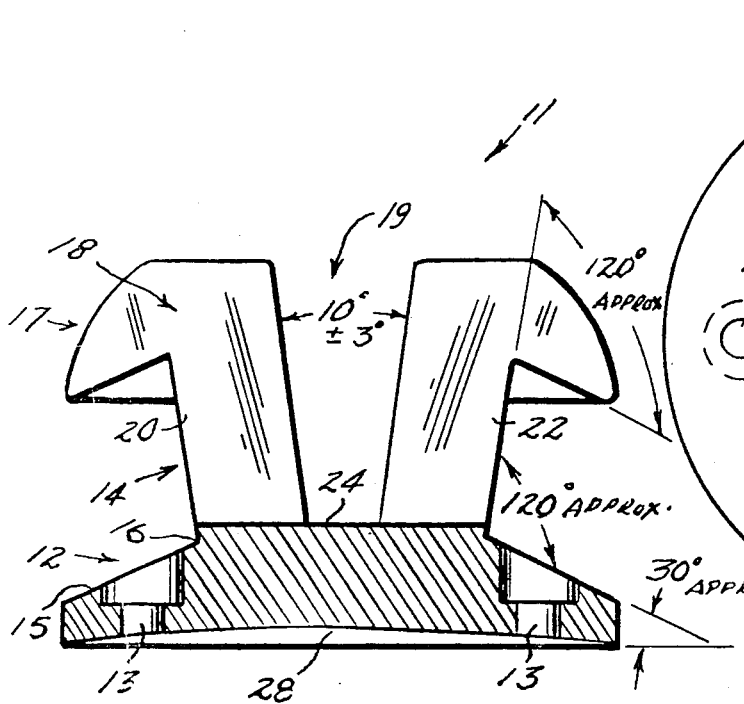
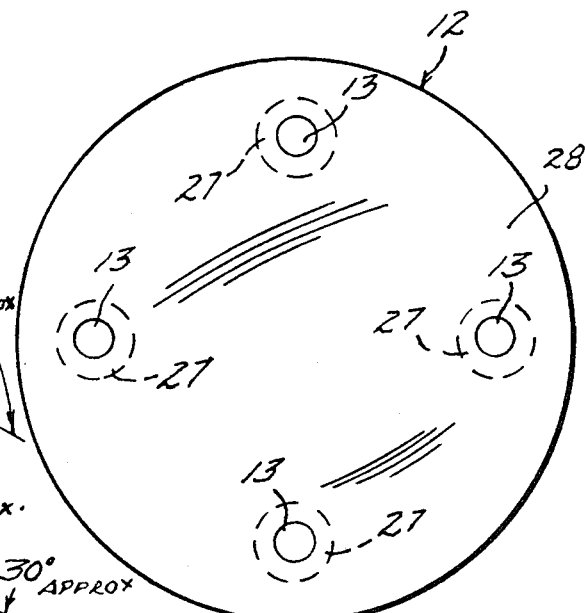
FIG. 1
FIG. 2
FIG. 3
FIG. 4

LINE FASTENING UNIT

The present invention is a continuation of application Ser. No. 749,659 filed June 28, 1985 and now U.S. Pat. No. 4,683,831 relates to a line fastening unit and more specifically to a new and improved form of cleat, bollard or chock primarily useful in boating applications and most beneficial in the setting of mooring lines aboard a boat or on a dock or wharf. Actually, the devices of the present invention find utility in miscellaneous areas where lines require fastening and adjusting and where a simple, fast securing means is desirable. An example of the latter is in the integration of the present structure into tent stakes for adjusting the securing lines. In marine applications, aside from in mooring utility, the present invention is useful for halyards, sheets, and all manner of rigging lines requiring adjustability while being secure and capable of rapid disengagement. The units also find additional utility in centerboard adjustment, rigging steering line, rigging to balance the rudder and in vangs for tightening or flattening of sails.

The prior art, as regards line fastening structures, runs from standard one-piece bollards to intricate jam and cam cleats and characteristic structures are suggested in the prior art represented by the line control means of U.S. Pat. No. 3,398,714 to C. O. H. Wallin, et al, utilizing a friction-inducing surface in a variety of forms; U.S. Pat. No. 3,838,659 to William H. Coleman, II directed to a split-topped marine bitt or bollard; U.S. Pat. No. 1,960,171 to A. M. Seeger for an electric wire line holder having a through passage; and U.S. Pat. No. 3,352,273 to Alexander G. Herreshoff, et al for a deck-mounted and radial-slotted cleat. None of these devices show or suggest the structure of the present line fastening unit and none show or suggest the functional range of the present line fastening structure.

Accordingly, the principal object of the present invention is to provide a new and very simple line fastening device which has multiple uses for fastening a broad range of line sizes and without the use of knots and in avoidance of excessive wear from high friction surfaces causing shearing, jamming and crushing of the line.

Another object is to provide a line holding device which is extremely easy to use in freeing line quickly and with or without following adjustment of the line and refastening.

Another object is to provide a line fastening device which blocks against movement of line in one direction of travel and which, by manipulation of the line, allows for adjustment of the holding position by paying out or taking up line.

Still another object is to create a line holding unit which is economical to use, simple to install and which requires no maintenance in a form to accept mooring loops in the manner of a bollard while serving as a handy winch or brake in picking up and letting out line with no moving parts aside from the line manipulation.

Other objects will be appreciated by those familiar in the art of securing lines and working lines as the description proceeds.

GENERAL DESCRIPTION

In general, the present inventive structure comprises a line fastening unit having a mounting base with a connected neck portion which rises upwardly in an upwardly flaring taper and the neck portion is connected at its end to a knob-like cap structure or extension and in which two wedge-shaped channels form connecting openings running through the principal axis of the cap and neck. This structure results in four slightly flared projections topped by the cap portions and uniquely presenting an entirely new and useful means for holding line in the general manner of a cleat, chock, or bollard, even without knots or formed line loops. In use, the line fastening structure of this invention is fastened in a vertical, horizontal or angled relation in consideration of line direction as to a deck, hull or a wall structure. Then, a line having a terminal loop is easily dropped over the upwardly projecting neck to provide terminal mooring hardware. In line which does not include a loop, the line may be conveniently secured by a normal cleating motion of the line and with a cinching simple knot. Alternatively, as will be seen, line may encircle and pass through the wedge slots in one direction, make at least a quarter further encircling turn, and then crossing the line through the second wedge slots or channel provides ample connection of line to the fastening unit so that all forces tending to remove the line on the working end results in a frictional increasingly secure grip on the line. The edges of the structure engaging the line cause selective locking, as desired. However, the line is easily and quickly released by lifting the bitter end of the line out of the wedge channel and from around the neck or post portion of the line fastening device. As will also be seen, the bitter end of a running line can be passed through one of the wedge openings and by forming, then, a running loop with the working end of the line to overlay the extension of the bitter end and encircle the neck, the working end is locked against withdrawal and, however, can be taken up by pulling on the bitter end or relaxed by paying out line from the bitter end. In mooring, this permits easy and rapid adjusting control of mooring lines, including balance of pairs of mooring or spring lines, and where the holding or slippage is wholly controlled by the operator or user without knots or plural windings of line. The wedge channel form assures adaptability to a wide size range of line and its function is independent of the type and style of line, weave or braid. The angular edges and the direction of line thrust against those fixed edges assures a very good hold on the line and as securely or as easily as an operator wishes without attention to knots and springs or moving cleats and wedges. The profile of the unit is reasonably low and the units may be fashioned from metal, plastic, wood, or decorative combinations of these where, for example, a plural element structure of base, neck, and knob or cap is desirable in manufacture or appearance. The preferred embodiment from the point of view of simplicity is the one-piece integrated unit.

IN THE DRAWINGS

FIG. 1 is a frontal perspective view of a line fastener in accord with the present invention integrally formed from a single piece of stock.

FIG. 2 is a top plan view of the line fastener seen in FIG. 1 and indicating the transverse upwardly flaring channeling through the principal axis of the unit.

FIG. 3 is a full section elevation view taken on the line 3—3 of FIG. 2 and best illustrates the depth of the flared or wedge-shaped channels and the arcuate or conical base shallowly conical at the bottom thereof to improve deck mounting as through the fastener openings and using screws or like structure, such as bolts, for hull or deck attachment.

FIG. 4 is a bottom plan view of the structure of FIG. 3 and indicating the arrangement of fastener openings.

SPECIFIC DESCRIPTION

Figure 5:
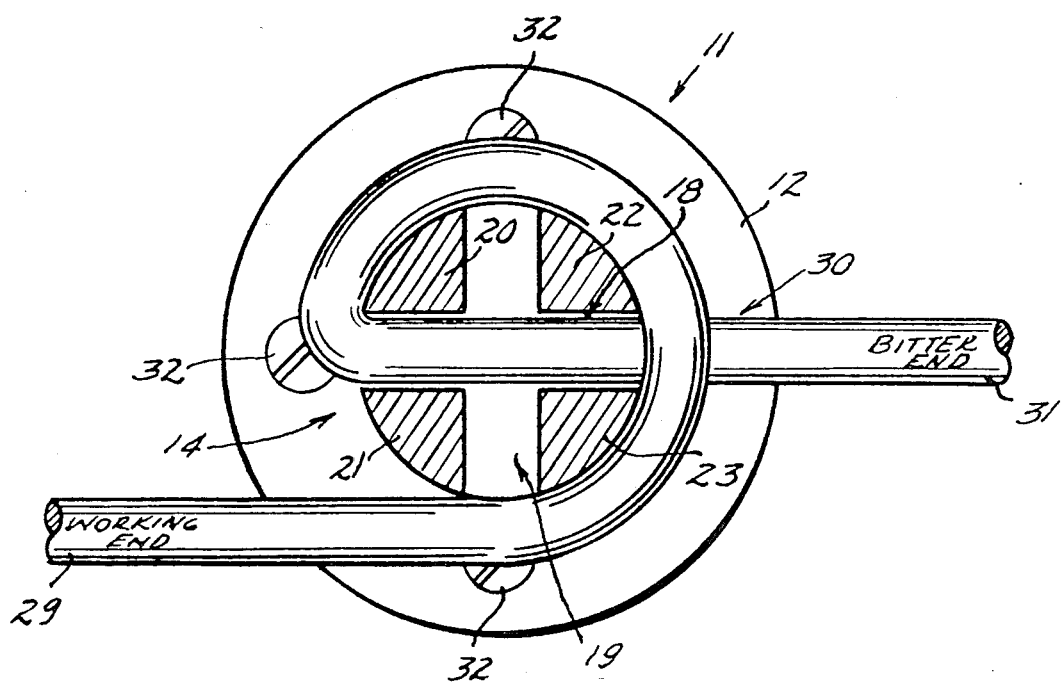
FIG. 5 is a partially cutaway top plan section view taken on a plane through the unit of FIGS. 1 or 3 and above a line cast on the fastener and adjustable by paying out or taking up line on the bitter end to the right of the FIG. 5 and causing locking of the working end as removal stresses tension the line on the working end.

Referring to the drawings and with first particularity to the FIG. 1, the construction of the line restraint or line fastening device 11 can be broadly understood. The fastening device 11 is a one-piece or integral construction in which the base portion 12 is adapted for fastening to a deck or use environment surface by fasteners through the fastener openings 13 and through the deck or hull (not shown). Upwardly from the base 12 and on the principal axis thereof is the neck portion 14. Where the base 12 is conical, generated by the surface 15, the neck portion 14 is also conical on the same axis as the base 12 but upwardly and outwardly flaring. As seen, the neck portion 14 and base 12 meet at the truncation line 16. Topping the neck portion 14 is an arcuately formed and enlarged knob or cap portion 17. The knob or cap 17 and the neck portion 14 are split transversely by two wedge-shaped channels or slots 18 and 19 which, on the principal axis of the structure 11, symmetrically divide the knob or cap 17 and the neck 14 into four upstanding posts 20, 21, 22 an 23. The wedge-like channels or slots 18 and 19 flare open upwardly, are open at the top, and terminate in the generally cruciform floor 24 located slightly above the truncation line 16. A flat 25 on each of the upper ends of the posts 20, 21, 22 and 23 is provided by a truncation of the arcuate cap 17, the truncation being transverse to the principal axis of the unit 11. The mushroom-like cap 17, in connection with the neck portion 14, forms an under-cut 26 at a somewhat acute angle, as will be seen. Shoulders 27 around the fastening openings 13 are countersunk in the base 12 to drop fastener leads (not shown) from protruding from the concial face 15. FIGS. 2, 3 and 4 further illuminate the construction as thus far described and in FIG. 3 the preferred angular relationships are expressed. In general, a reasonable variance of about five degrees can be tolerated but optimum angles are indicated. As will be appreciated, the wedge channels 18 and 19 are configured to open upwardly and are sized to accommodate a broad range of line sizes to the point where they can enter the slots of 18 and 19 and be easily lifted therefrom. It will be appreciated that sizes can be changed without adverse performance and that the profile can be lowered to the extent that overall strength is not adversely influenced. In FIG. 3, the arched or shallow conical configuration of the bottom 28 of the base 12 can best be appreciated. This assures upward movement of line to the neck portion 14. As courses of line are added, they jam upon the edges formed by the under-cut 26 at intersection with wedge channels 18 and 19.

In general, the terms "bottom," "top," "upwardly" and the like have reference to a unit 11 mounted in a horizontal position as shown in FIG. 30 so that the perimeter of base 12 is flush against a deck or connecting surface. It will be appreciated that the unit 11 may be mounted at right angles to the position shown in FIG. 3 as, for example, in use as a mast mount cleat device, and at intermediate angles as necessitated by hull design or mounting surface.

All line contacting edges are rounded on a radius of at least about 1/32 inch so that as lines are convoluted between and around the posts 20, 21, 22 and 23 and against the edges of under-cut 26 or the edges formed by the cruciform floor 24, there is no tendency to cut the usual material or fibers of the line. It is preferred that the entire line contacting surface of the unit 11 be smooth to the feel.

Figure 6:
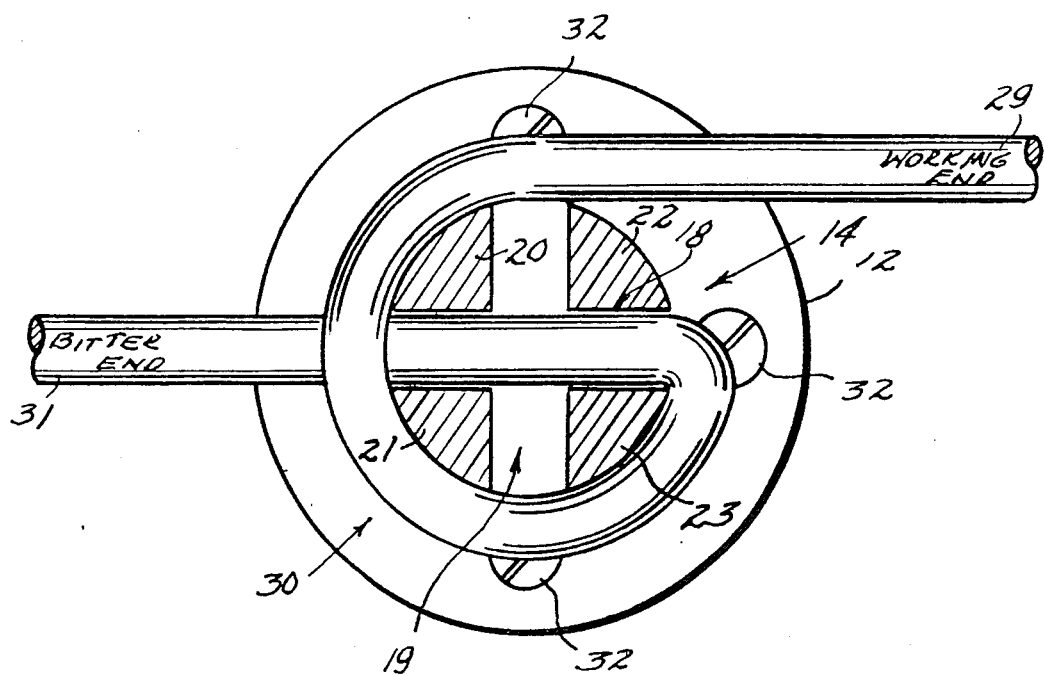
FIG. 6 is the same as the FIG. 5 but with the bitter end of the line and the working end of the line reversed to lock the working end and adjust at the bitter end.

In use, the device of FIGS. 1, 2 and 3 present a wide variety of opportunities for the rigging and security of line. In the manner of a bollard or cleat, a terminal loop or a mooring line is easily dropped over the knob or cap 17 and rides on the neck 14 secure until freed. Line may also be knotted around the neck portion 14 secured by the under-cut 26 and cap 17 against an upward bias. In the manner of usual cleating, the lines may be convoluted through the wedge channels 18 and 19 and around selected alternate posts 20, 21, 22 and 23 and any tendency to raise the line encounters the brake stop of the under-cut 26, as well as the plural engagement with impinging edges of the posts 20, 21, 22 and 23. Where a simple holding adjustment is desired, a turn of line around the neck portion 14 allows the line to be eased off or easily tightened. More importantly, no knots need be used where the line enters through one of the wedge channels 18 and 19 and is then wound around one or more of posts 20, 21, 22 and 23 in a left or right cast and then the bitter bend of the line is positioned through one of the channels 18 and 19 over the top of prior runs. The working end of the line is secure against the unit 11 until failure of fastenings or line. The wedge channels 18 and 19 provide simple, fair leads at entry of a line for fastening and then the combination of the structure of the unit 11 and the tensions in the working end of line achieve lock-up against the line that is convenient and accommodating to various usages. Plural lines can also be used on the same unit 11 and variations in line sizes within the capacity of a given unit can be accomodated. For example, in the unit illustrated acceptance of lines from one-quarter inch diameter to five-eighths inch diameter are satisfactorily handled. This is especially beneficial where a balanced pair of mooring lines are used. By reference to FIGS. 5 and 6, the units 11 are illustrated to show a form of use well beyond the capability of other known cleats and fasteners and providing an approximation of cam cleats without the requirement of moving parts and springs. The FIGS. 5 and 6 show a usage of the unit 11 in either direction to adjust the working end 29 of a line 30 by manual control of the bitter end 31 of the line 30. The working end 29 is the outboard end of the line 30 usually considered as connected to a point such as a dock or towed vessel or the like. The bitter end 31 is the inboard end of line 30 and the end manipulated to hold or attach to the fastening unit 11. The bitter end 31, in hand, is passed through one of the wedge channels 18 and 19 and a loop is then formed around a pair of the posts as 20 and 22 to pass over the entry of the bitter end 31 and around the neck 14 and thence to the connection of the working end 29. Slack in the working end 29 can be taken up by pulling on the bitter end 31. Alternatively, the paying out of the work end 29 can be achieved by using the line connected to the bitter end to relax through the wedge channel 18. Tensioning the bitter end 31 locks the working end. When adjusted, the bitter end 31 can be curled around the neck 14 and laid up over the line 30 in channel 18 and line 30 in channel 91. This allows quick pick-up of slack from the bitter end 31 and release of the fastening, if desired, without resort to untying any knots or involving complex manipulation.

The FIG. 6 illustrates the exact juxtaposition of the bitter end 31 and working end 29 on the fastening unit 11. The same operational procedures are applicable and in both instances tension from the working end 29 will not free but lock the line 30, as shown, against edges of post 23 where the line 30 abruptly changes direction and the urging of the line 30 downwardly on bitter end 31 against the shoulder surface of the edge of the cruciform floor 24 against the drop of the neck 14 at the truncation line 16 between base 12 and tapered neck 14. The taper of the neck 14 urges this downward force by the line 30 as it crosses the side of the bitter end 31.

The described function will be readily appreciated by sailors and boaters to extend the working range of the simple cleat or chock of unit 11.

Fasteners, as screws, 32 pass through the base 12 for rigid connection of the unit 11 with heads of the fasteners 32 resting on the countersink shoulders 27 seen best in FIGS. 1-4.

Figure 7:
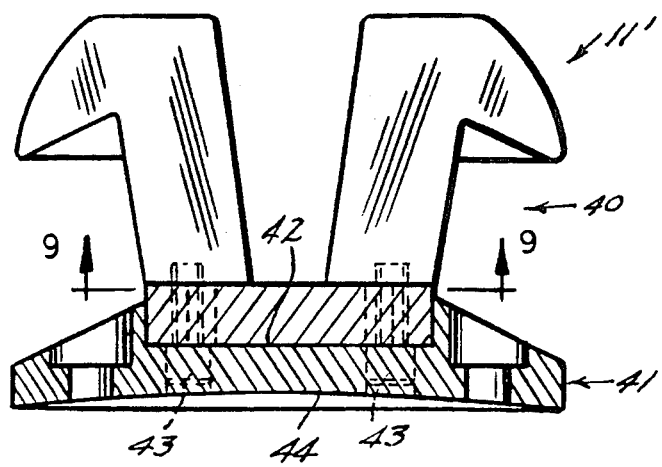
FIG. 7 is a partial cross-sectional elevation view of a modified line fastening unit in two-part line form and taken through the principal axis of the line fastener unit on a plane through one of the wedge slots or channels and indicating a socket-like arrangement and the two-part construction.
Figure 9:
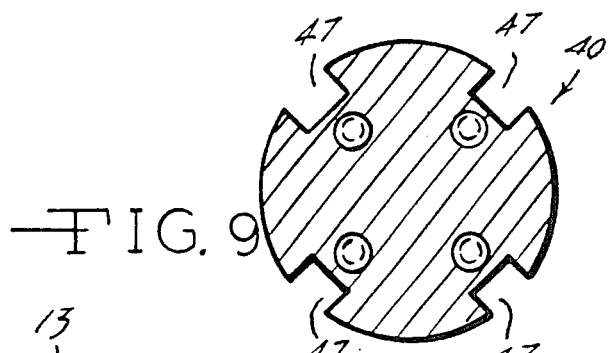
FIG. 9 is a cross section plan view taken on the line 9—9 of FIG. 7 and indicating the mating keying configuration of the neck portion and with base fastening provisions.
Figure 8:
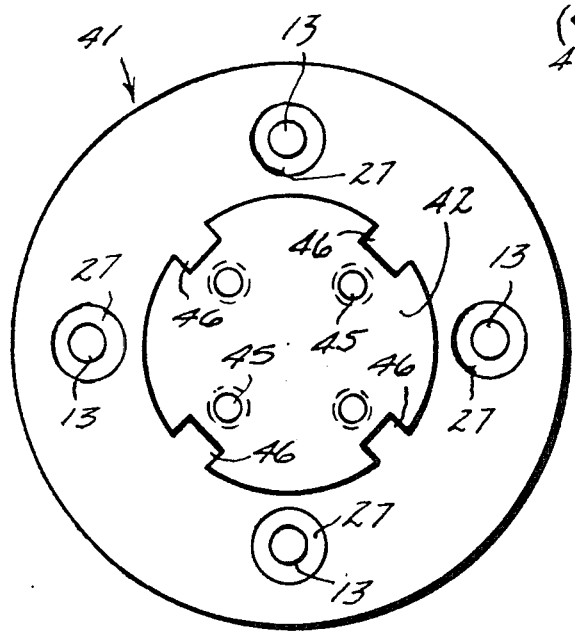
FIG. 8 shows a top plan view of the base in the embodiment of FIG. 7 and indicating the keying and socketing arrangement cast into or otherwise provided in the base.
Figure 10:
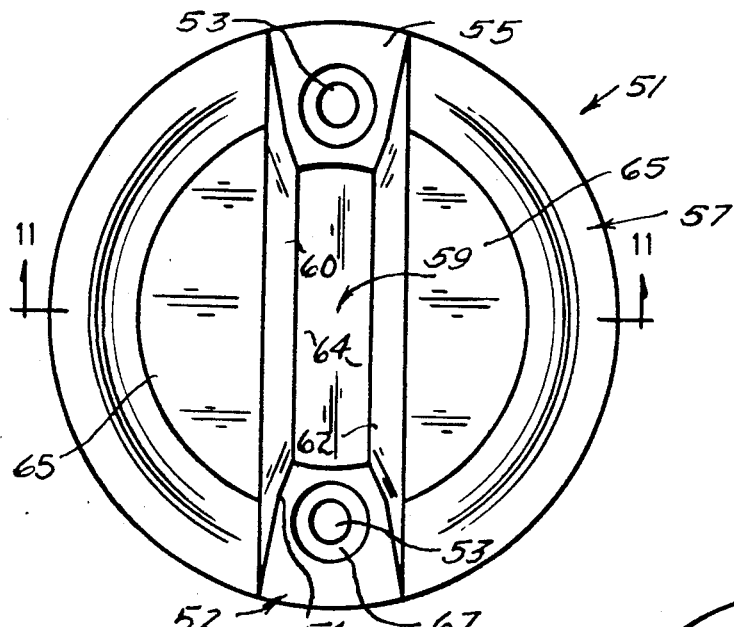
FIG. 10 is a top plan view of a two-pedestal line fastening structural variation in accord with the present invention.
Figure 12:
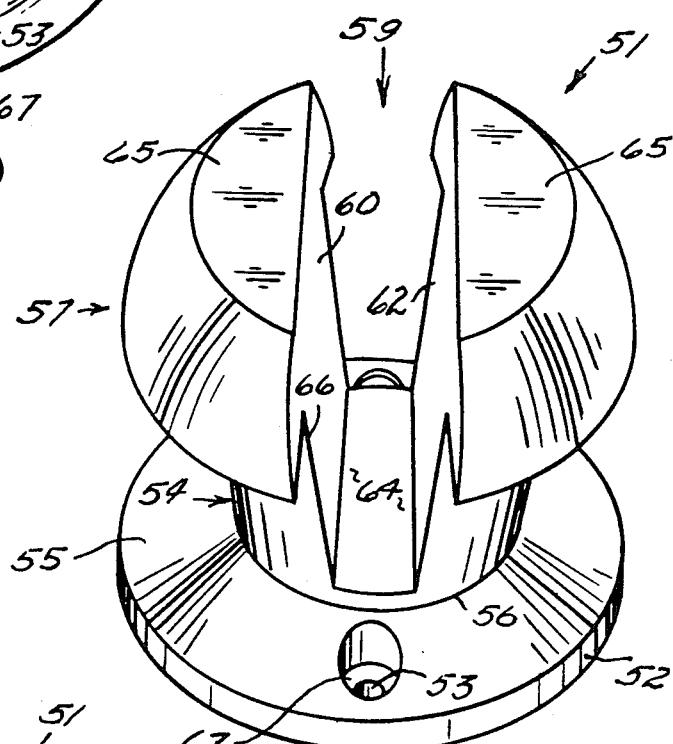
FIG. 12 is a perspective view of the line fastening unit shown in FIGS. 10 and 11 and providing a more visually comprehensive showing.
Figure 11:
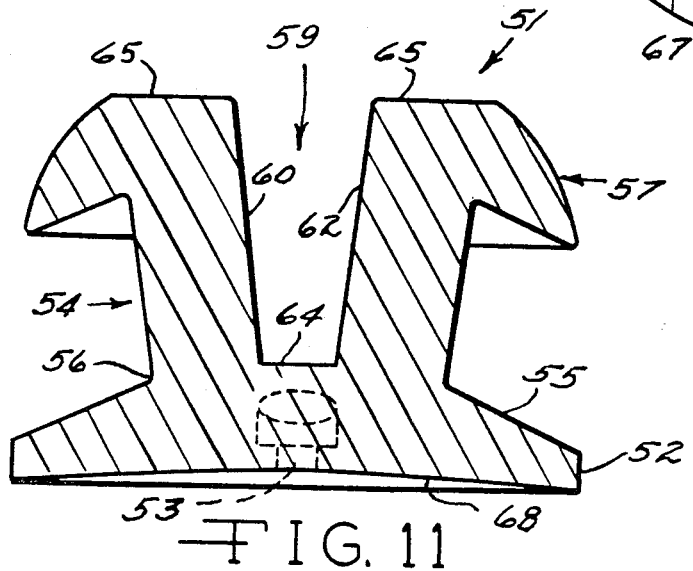
FIG. 11 is a full cross section elevation view of the structure of FIG. 10 and taken on the line 11—11 of FIG. 10.
Figure 13:
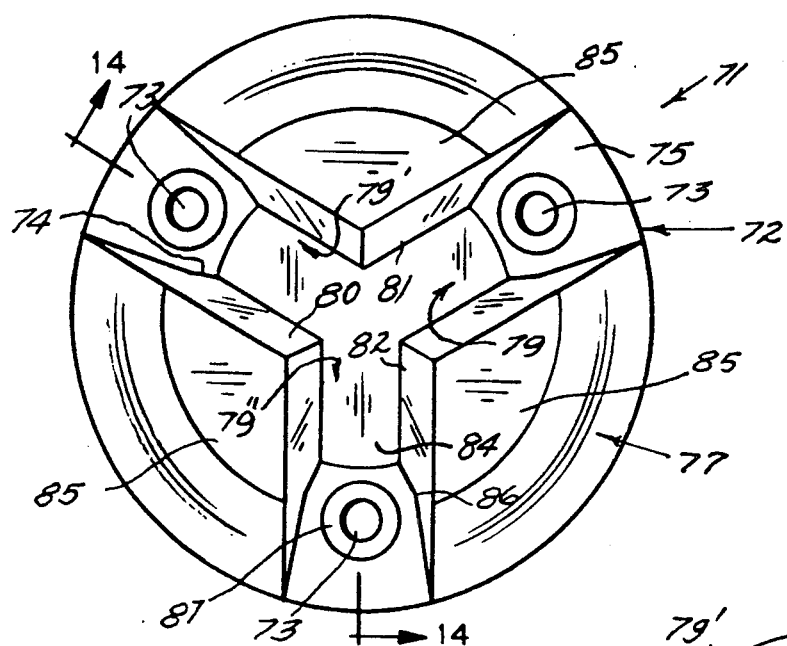
FIG. 13 is a top plan view of a three-pedestal line fastening structural variation in accord with the present invention.
Figure 15:
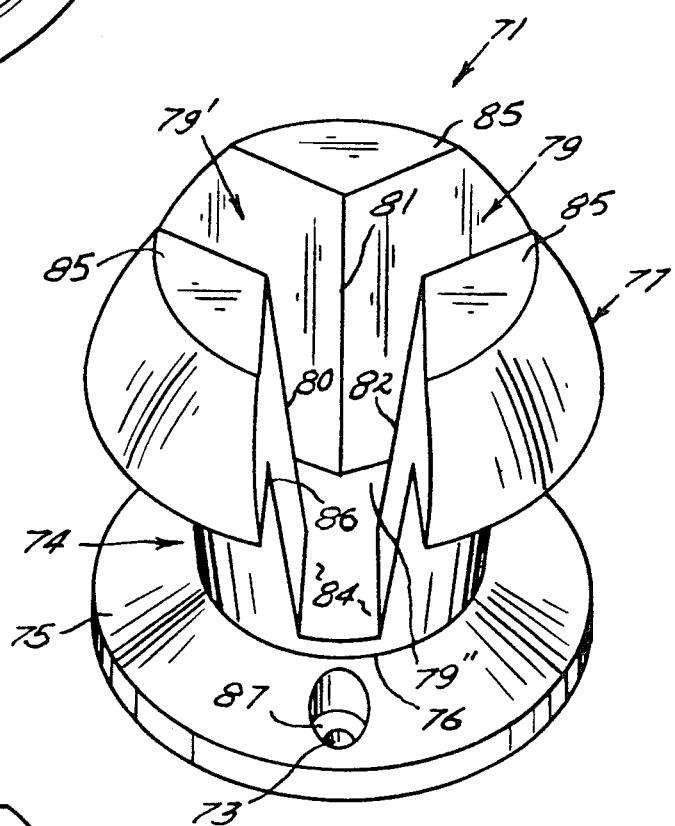
FIG. 15 is a perspective view of the line fastening unit shown in FIGS. 13 and 14 and providing a more visually comprehensive showing.
Figure 14:
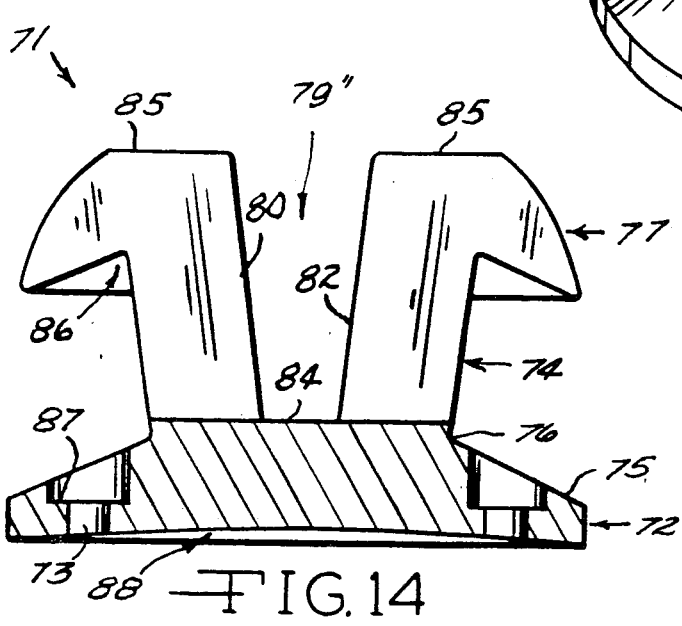
FIG. 14 is a cross section elevation view of the structure of FIG. 13 and taken on the line 14—14 of the FIG. 13.

The FIGS. 7, 8 and 9 refer to a modified form 11' of the line fastener or restraint unit 11. This modification permits the unit 11' to be formed in two pieces, the head portion 40 and the base portion 41 and in other particulars constructed as the line fastener 11, earlier described. The head 40 rests in a socket 42 provided in base portion 41 and fasteners 43 (one or more) secure the head 40 in the socket 42 of the base 41. This axially aligns the head portion with the base 41. The arched bottom 44 of the base 41 assures firm deck or hull mounting contact of the unit 11' wherein mounting fasteners 32 (previously described) are passed through openings 13 and against shoulders 27. This is better understood by reference to the base 41 as seen in FIG. 8. In that FIG. 8, the openings 45 for the fasteners 43 are best understood as running upwardly through the socket 42 for threaded connection of the head 40 as seen in FIG. 7. In addition, the radial key projections 46 projecting into the socket 42 are best appreciated, These, as can be seen in FIG. 9, cooperate with corresponding keyways 47 which nestably receive the key projections 46 beyond assembly in prevention of any relative movement between the head portion 40 and base 41. The modification in FIGS. 7, 8 and 9 allows the fastener unit 11' to be production cast in two or more parts for processing and assembly and without impairing ultimate strength and function. This eliminates considerable machining and finishing. Fastener units 11 and 11' may be made in metals (brass, aluminum, plastic, and plated die-cast), as well as wood and composites. Working edges (those contacting line) are deburred and given a radius of about one-thirty second of an inch.

Observors can perceive that devices in accord with the present invention may be worked up from the solid, investment cast and machined or made up in composites as shown in the FIGS. 7-9, inclusive. Various sizes and variant profiles can be made.

Having thus described a preferred embodiment and alternate operable units, those skilled in the art will quickly perceive improvements, modifications and changes and such improvements, modifications and changes are intended to be included herein, limited only by the scope of my hereinafter appended claims.

I claim:

1. A line fastening unit comprising:
   a mounting base;
   a neck portion connected to said base and rising therefrom with a gradually up-flaring taper; and
   a knob-like cap structure surmounting said neck portion and forming at the intersection of cap and neck an overhang and angled groove, said cap and neck portions forming plural upstanding pedestals from said base and each of said pedestals separated from the next adjacent of said pedestals by at least one wedge-shaped downward tapering channel opening passing through the principal axis of said cap and neck and extending to said base.

2. In the combination of claim 1 wherein said pedestals rising from said base and separated by said wedge-shaped channel openings, are two in number.

3. In the combination of claim 1 wherein said pedestals are three in number.

4. In the combination of claim 1 wherein each of said pedestals have substantial shape and size with the other of said plural pedestals and all of said pedestals rise from a common base.

* * * * *

UNITED STATES PATENT AND TRADEMARK OFFICE
CERTIFICATE OF CORRECTION

PATENT NO. : 4,763,595
DATED : August 16, 1988
INVENTOR(S) : Lorn O. Shaffner

It is certified that error appears in the above—identified patent and that said Letters Patent is hereby corrected as shown below:

Col 3, line 67 after "22" change "an" to read --- and---

Col 4, line 11 correct "concial" to read --- conical ---.

, line 32 correct "30" to read --- 3 ---

Col 6, line 15, change the ", These" to read --- . These ---.

, line 17, change "beyond" to read --- upon ---.

Signed and Sealed this

Twenty-first Day of February, 1989.

Attest:

DONALD J. QUIGG

Attesting Officer

Commissioner of Patents and Trademarks